US011447201B2

(12) United States Patent
Coaplen et al.

(10) Patent No.: US 11,447,201 B2
(45) Date of Patent: Sep. 20, 2022

(54) DROPPER SEATPOST HEAD ASSEMBLY

(71) Applicant: Fox Factory, Inc., Braselton, GA (US)

(72) Inventors: Joshua Coaplen, Asheville, NC (US); Bryan Wesley Anderson, Santa Cruz, CA (US); William M. Becker, Aptos, CA (US)

(73) Assignee: Fox Factory, Inc., Duluth, GA (US)

( * ) Notice: Subject to any disclaimer, the term of this patent is extended or adjusted under 35 U.S.C. 154(b) by 79 days.

(21) Appl. No.: 16/778,319

(22) Filed: Jan. 31, 2020

(65) Prior Publication Data

US 2020/0247492 A1 Aug. 6, 2020

Related U.S. Application Data

(60) Provisional application No. 62/799,521, filed on Jan. 31, 2019.

(51) Int. Cl.
*B62J 1/08* (2006.01)

(52) U.S. Cl.
CPC ............ *B62J 1/08* (2013.01); *B62J 2001/085* (2013.01)

(58) Field of Classification Search
CPC ....................................... B62J 1/04; B62J 1/08
See application file for complete search history.

(56) References Cited

U.S. PATENT DOCUMENTS

| 10,787,215 B1 * | 9/2020 | Staples | B62J 1/08 |
| 2010/0052377 A1 * | 3/2010 | Hsu | B62J 1/08 |
| | | | 297/215.14 |
| 2013/0221713 A1 * | 8/2013 | Pelot | G05D 7/0635 |
| | | | 297/215.13 |
| 2015/0239516 A1 * | 8/2015 | Nelson | B62K 19/16 |
| | | | 297/215.15 |
| 2018/0244330 A1 * | 8/2018 | Shirai | B62J 1/08 |
| 2019/0144061 A1 * | 5/2019 | Staples | B62J 1/08 |
| | | | 297/215.15 |
| 2019/0233040 A1 * | 8/2019 | Katsuki | B62J 99/00 |
| 2019/0351966 A1 * | 11/2019 | Shirai | B62J 99/00 |
| 2020/0023918 A1 * | 1/2020 | Shirai | B62J 1/08 |
| 2020/0140029 A1 * | 5/2020 | Shipman | B62J 1/08 |
| 2020/0377176 A1 * | 12/2020 | Shirai | B62J 45/20 |
| 2021/0031850 A1 * | 2/2021 | Coaplen | B62K 19/36 |

FOREIGN PATENT DOCUMENTS

| CA | 3053537 A1 * | 2/2020 | ............ B62K 19/36 |
| DE | 202016106764 U1 * | 12/2016 | ............ B62K 19/36 |
| DE | 102019106615 A1 * | 10/2019 | ............... B62J 1/08 |
| EP | 2826698 B1 * | 8/2015 | ............... B62J 1/08 |
| WO | WO-2016113682 A1 * | 7/2016 | ............... B62J 1/08 |

* cited by examiner

*Primary Examiner* — Timothy J Brindley (57) ABSTRACT

A dropper seatpost head assembly is disclosed. The assembly includes a lower post for insertion into a seat tube of a vehicle and an upper post having a housing coupled at one end thereof, the upper post to telescopically slide with respect to the lower post to form a dropper seatpost. The assembly also includes a saddle rail clamp assembly having a lower saddle rail clamping portion rotatably coupled with the housing and an upper saddle rail clamping portion to couple with the lower saddle rail clamping portion to form a clamping structure. The lower saddle rail clamping portion having a drooped shape such that the lower saddle rail clamping portion and the clamping structure hang down in a plane that intersects at least a portion of the housing.

15 Claims, 10 Drawing Sheets

DROPPER SEATPOST HEAD ASSEMBLY

CROSS-REFERENCE TO RELATED APPLICATIONS PROVISIONAL

This application claims priority to and benefit of U.S. Provisional Patent Application No. 62/799,521 filed on Jan. 31, 2019, entitled "A DROPPER SEATPOST HEAD ASSEMBLY" by Coaplen et al., and assigned to the assignee of the present application, the disclosure of which is hereby incorporated by reference in its entirety.

FIELD OF THE INVENTION

Embodiments of the invention generally relate to systems and methods for adjusting the pitch and fore/aft position of a saddle on a dropper seatpost having a height that can be varied while the saddle is being utilized.

BACKGROUND

Saddle height and saddle orientation are important parts of a vehicle (such as a bicycle, unicycle, tricycle, and the like) setup. If the saddle is too high, a rider sitting on the saddle will feel unstable. In contrast, if the saddle is too low, the rider sitting on the saddle would feel cramped. Moreover, if the saddle is pitched too far forward (or too far backward) it will cause undue discomfort for the rider. Additionally, what would be considered a good set-up for riding along a road, may not be a good set-up for climbing a hill, which may also be different than a good set-up for riding down a hill, for riding across rough terrain, etc. As such, there is no universal saddle geometry settings, instead saddle settings are at least user and use case dependent.

BRIEF DESCRIPTION OF THE DRAWINGS

Aspects of the present invention are illustrated by way of example, and not by way of limitation, in the accompanying drawings, wherein.

The drawings referred to in this description should be understood as not being drawn to scale except if specifically noted.

DESCRIPTION OF EMBODIMENTS

The detailed description set forth below in connection with the appended drawings is intended as a description of various embodiments of the present invention and is not intended to represent the only embodiments in which the present invention is to be practiced. Each embodiment described in this disclosure is provided merely as an example or illustration of the present invention, and should not necessarily be construed as preferred or advantageous over other embodiments. In some instances, well known methods, procedures, and objects have not been described in detail as not to unnecessarily obscure aspects of the present disclosure.

Terminology

In the following discussion, a number of terms and directional language is utilized. Although the technology described herein is useful on a number of vehicles that have an adjustable saddle, a bicycle will be used to provide guidance for the terms and directional language.

The term "seat tube" refers to a portion of a frame to which a dropper seatpost is attached.

In general, a bicycle has a front (e.g., the general location of the handlebars and the front wheel) and a rear (e.g., the general location of the rear wheel). For purposes of the discussion the front and rear of the bicycle can be considered to be in a first plane. A second plane that is perpendicular to the first plane would be similar to an exemplary flat plane of the ground upon which the bicycle is ridden.

In the following discussion, the pitch of the saddle refers to the exemplary horizontal plane drawn from the front of the saddle to the back of the saddle. For example, if the saddle is mounted to the dropper seatpost head with a zero-degree pitch, the front of the saddle and the back of the saddle would rudimentarily be in a horizontal plane having a parallel orientation with the exemplary flat plane of the ground as described above.

An upward pitch of the saddle would occur when the saddle rotates about the dropper seatpost head such that the front of the saddle is higher (e.g., further from the ground plane) while the rear of the saddle is lower (e.g., closer to the ground plane). In an upward pitch scenario, the saddle plane would no longer be parallel with the flat plane of the ground but would instead intersect the ground plane at some location aft of the dropper seatpost head.

In contrast, a downward pitch of the saddle would occur when the saddle rotates about the dropper seatpost head such that the front of the saddle is lower (e.g., closer to the ground plane) while the rear of the saddle is higher (e.g., further from the ground plane). In a downward pitch scenario, the saddle plane would no longer be parallel with the flat plane of the ground but would instead intersect the ground plane at some location forward of the dropper seatpost head.

Overview

The following discussion provides a novel solution for a dropper seatpost head that includes the ability to allow "infinite" (un-indexed) adjustment of the saddle's pitch. Further, embodiments reduce the dead length of the dropper seatpost while maintaining a consistent separation from a base of a saddle and the upper saddle rail clamping portion 430 of saddle clamp assembly 400.

The following discussion will describe conventional seatposts and limitations thereof. The discussion then turns to embodiments: the structure and function of the vehicle assembly along with a dropper seatpost having a user interface attached thereto, and a number of fastener types and orientations that are configurable for reducing the dead length of the dropper seatpost while also allowing adjustment to the pitch of the saddle. Embodiments described herein minimize or remove any fastener incursion that would reduce the standoff distance, between the upper saddle rail clamping portion and the bottom of the saddle, to less than the flex range of the saddle.

Figure 1:
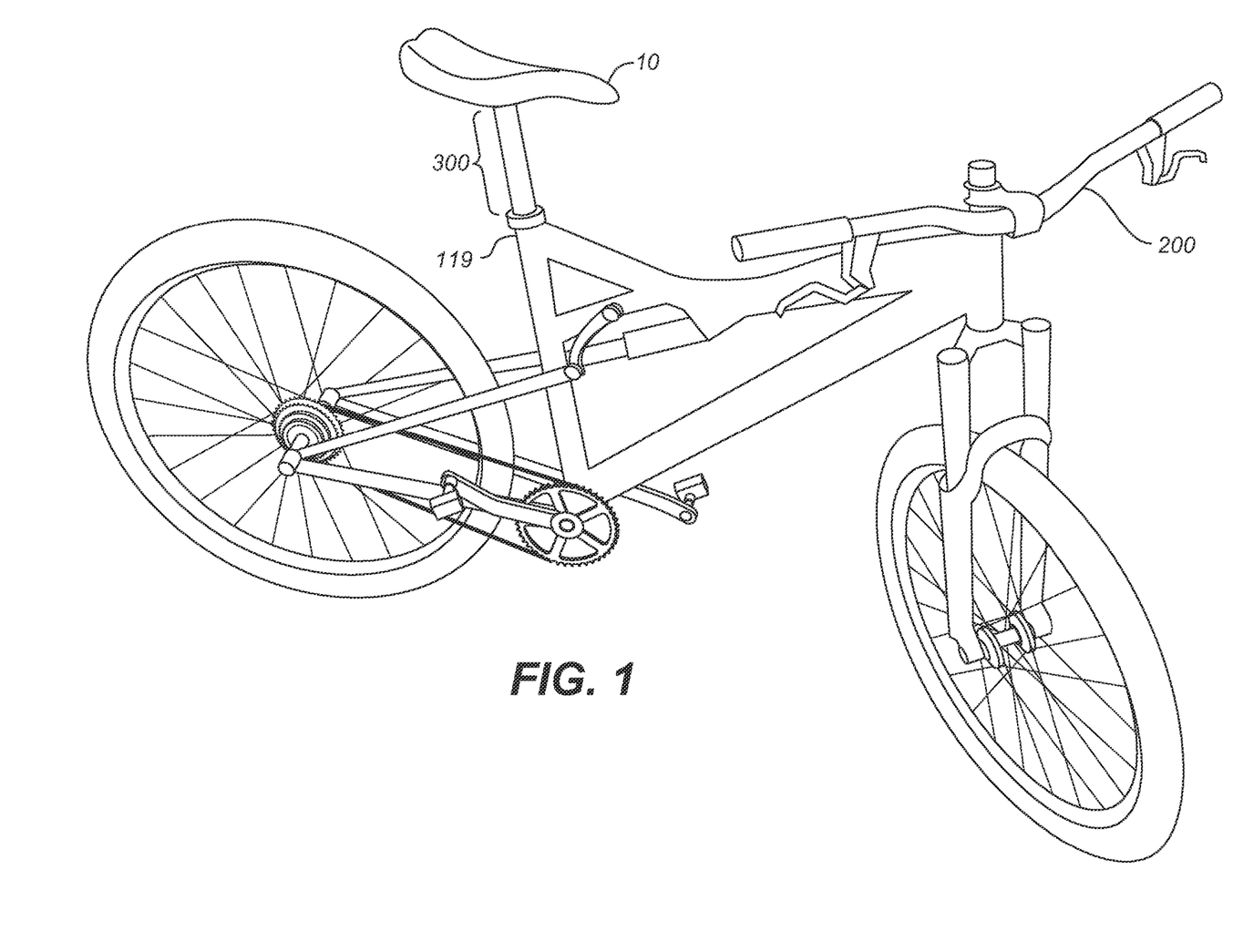
FIG. 1 is a perspective view of a bicycle, in accordance with an embodiment.

Referring now to FIG. 1, a bicycle is shown in accordance with an embodiment. In general, the bicycle includes pedals, wheels, a chain or other drive mechanism, brakes, an optional suspension, a saddle 10 (or bicycle seat), a handlebars 200, a dropper seatpost 300, and a bicycle frame 119. In one embodiment, dropper seatpost 300 is a tube that extends upwards from the bicycle frame 119 to the saddle 10. The amount that dropper seatpost 300 extends out of the frame can usually be adjusted. Dropper seatpost 300 may be made of various materials, such as, but not limited to being, the following: steel, aluminum, titanium, carbon fiber, and aluminum wrapped in carbon fiber.

Figure 2:
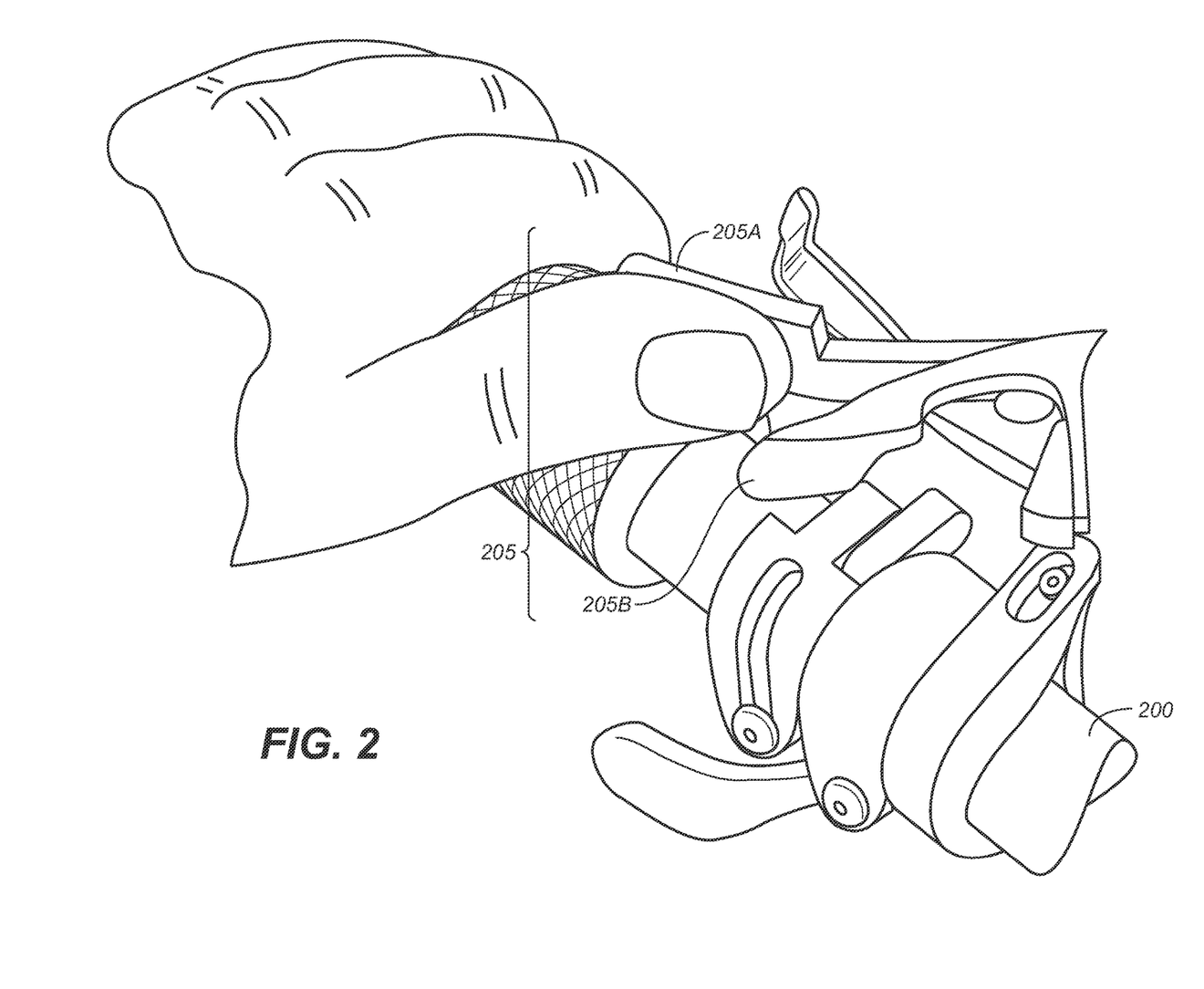
FIG. 2 is a perspective view of a handlebar with a set of control levers coupled therewith, in accordance with an embodiment.

FIG. 2 depicts a handlebar 200 with a set of control levers 205 coupled therewith, according to an embodiment. The set of control levers 205 is a type of user interface with which the user employs for communicating dropper seatpost height instructions to the dropper seatpost. Of note, the set of control levers 205 is used herein to describe various embodiments. However, it should be understood that the term, "user interface" may be substituted for the set of control levers 205, in various embodiments. It should also be appreciated that the user interface may be at least, but not limited to, any of the following components capable of communicating with the dropper seatpost: wireless device, power meter, heart rate monitor, voice activation device, GPS device having stored map, graphical user interface, button, dial, smart phone (e.g., iPhone™), and lever).

The set of control levers 205 includes at least one control lever, such as the first control lever 205A and may include a second control lever 205B, it should be understood that in an embodiment, there may be only a single control lever, or in an embodiment there may be a set of control levers. For simplicity, 205 will be referred to as a set of control levers. The set of control levers 205 are mechanically and/or electronically connected (via wire/cable and/or wirelessly) to various components within the dropper seatpost. When the cyclist moves the set of control levers 205, via the connections between the set of control levers 205 and the dropper seatpost, he is causing a cam within the dropper seatpost to shift positions. The shifting cam, in turn, moves against valves, causing the valves within a valve system to open and/or close. This opening and/or closing of the valves control the fluid movement through and surrounding the valve system.

Figure 3:
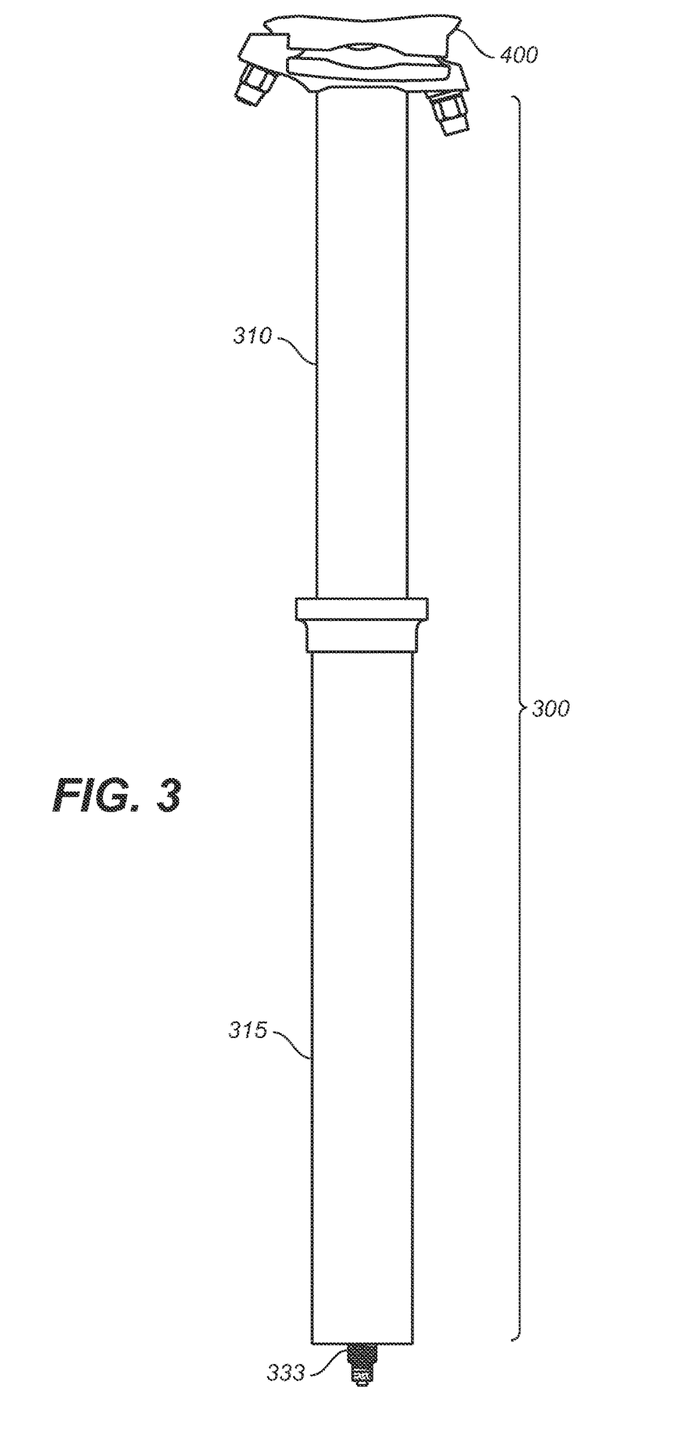
FIG. 3 is a perspective view of a dropper seatpost coupled with a saddle clamp assembly, in accordance with an embodiment.

FIG. 3 is a perspective view of a dropper seatpost 300 coupled with a saddle clamp assembly 400. In one embodiment, the dropper seatpost 300 includes an upper post 310 and a lower post 315 within which the upper post 310 telescopically slides upon actuation of a handlebar lever, such as the set of control levers 205 shown in FIG. 2. In one embodiment, the dropper seatpost 300 includes an air valve 333 which is used to adjust the air pressure within dropper seatpost 300.

Figure 6:
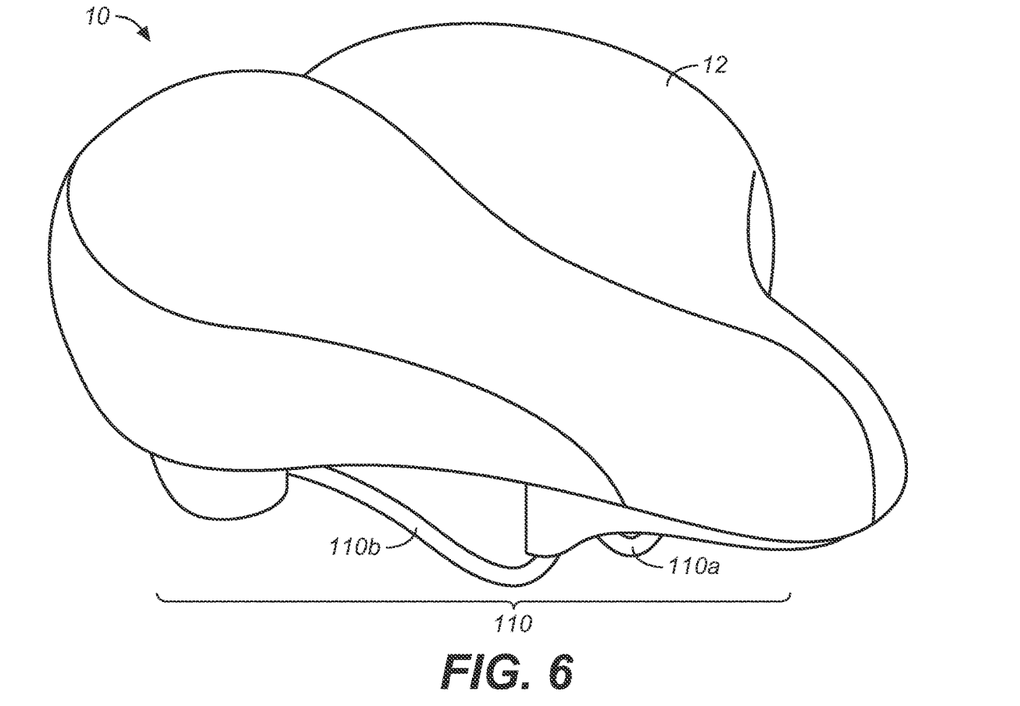
FIG. 6 is a perspective view of a saddle, in accordance with an embodiment.

In one embodiment, saddle clamp assembly 400 is a two clamp dropper seatpost having two fasteners to maintain a clamping force between the upper clamp and lower clamp to hold onto saddle rails 110 (shown in FIG. 6). In addition, the two fasteners are used to adjust the pitch of the saddle 10, e.g., nose-up or nose-down. Further, saddle clamp assembly 400 is able to accommodate different seat-tube angles, different saddles, and different saddle pitch angles. As stated herein, the saddle pitch adjustment is important for personal rider preferences, different seat-tube angles, different saddle designs, and the like.

In one embodiment, dropper seatpost 300 and at least part of saddle clamp assembly 400 are formed as a single component. In another embodiment, dropper seatpost 300 and saddle clamp assembly 400 consist of two or more distinct and/or different components. Further, dropper seatpost 300 and saddle clamp assembly 400 are formed of the same materials, formed of different materials, etc. The materials include a group of materials such as, but not limited to, a metal, a composite, a combination of both metal and composite parts within each part, and the like. The metal options include, but are not limited to, steel, aluminum, titanium, and the like. The composite materials include carbon-based composites, plastics, and the like.

For example, an aluminum saddle clamp assembly 400 and an aluminum dropper seatpost 300, a titanium saddle clamp assembly 400 and a carbon dropper seatpost 300, a carbon saddle clamp assembly 400 and a titanium dropper seatpost 300, a carbon saddle clamp assembly 400 and a steel dropper seatpost 300, etc. Similarly, there can be other materials utilized such as carbon/metal mix (amalgamation, etc.) For example, saddle clamp assembly 400 consist of a carbon body with metal inserts, etc.

Additional details regarding the operation of a dropper seatpost assembly is found in U.S. Pat. No. 9,422,018 entitled "Seatpost" which is assigned to the assignee of the present application, and which is incorporated herein by reference in its entirety.

Figure 4:
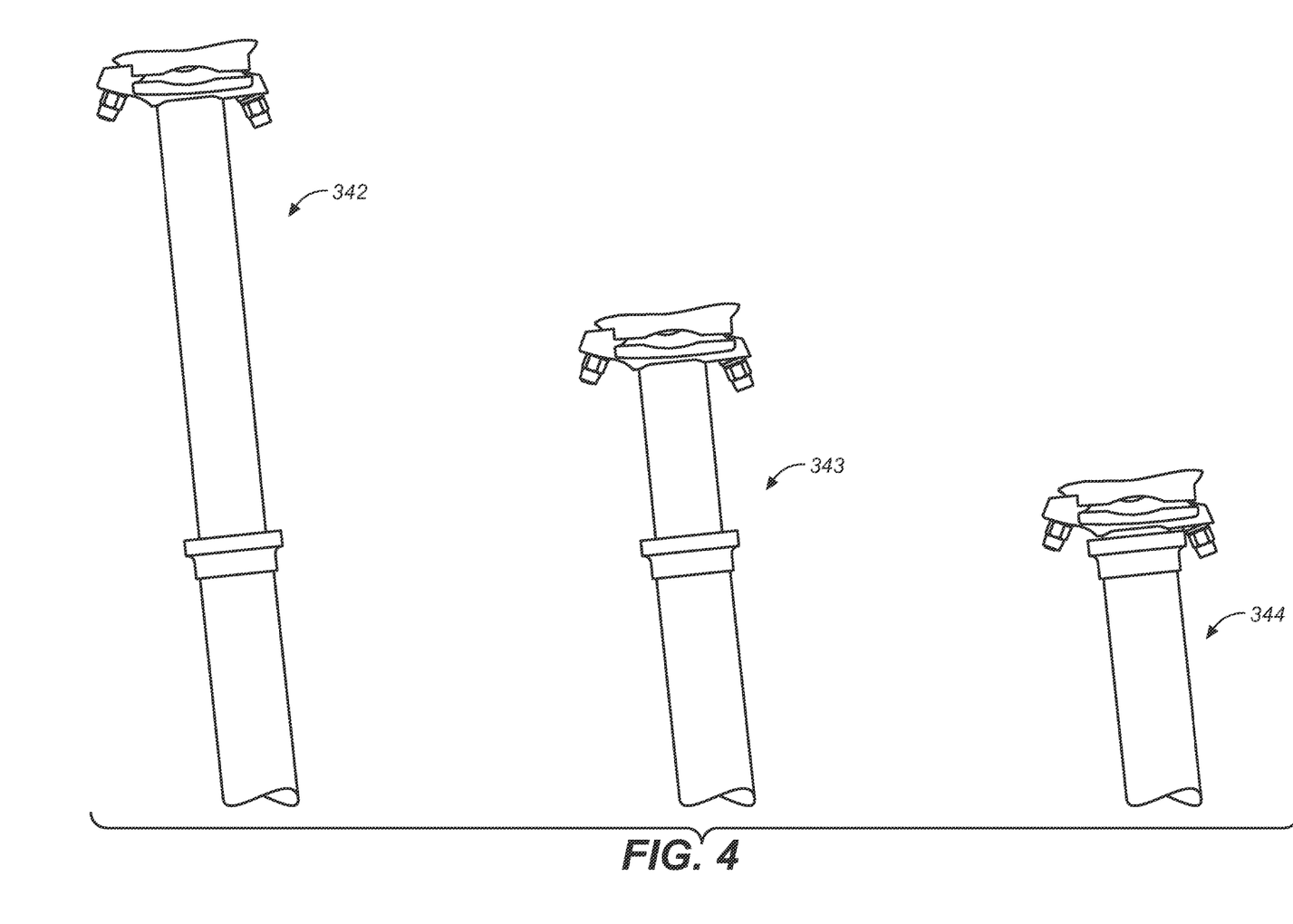
FIG. 4 is a perspective view of a plurality of different positions for the dropper seatpost, in accordance with an embodiment.

FIG. 4 is a perspective view of a plurality of different positions for dropper seatpost 300 shown in accordance with one embodiment. In FIG. 4, dropper seatpost 342 is shown in full extension, dropper seatpost 343 is shown in partial extension, and dropper seatpost 344 is shown in full compression. In one embodiment, the dropper seatpost can be remotely shortened (lowered) using a control lever positioned on the bicycle's handlebar (as shown and described in FIG. 2).

On technical sections of a trail, a rider may cause the dropper seatpost to lower by triggering the actuating lever on the handlebar while the rider also depresses the saddle. Typically, the actuating lever of a dropper seatpost will open a valve or latch in the dropper seatpost so that the dropper seatpost can move up or down. In one embodiment, dropper seatposts have an air spring (mechanical spring, or the like) and use the rider's weight to move them down, and will only raise themselves when the valve or latch internal to the dropper seatpost is opened (via handlebar remote). In one embodiment, dropper seatposts are "microadjustable". There are two types of microadjustable dropper seatposts: (1) dropper seatposts that can be continuously adjusted to an infinite number of positions; and (2) dropper seatposts that can only be adjusted to a predetermined (preprogrammed) number of positions.

For example, with regard to dropper seatpost that can only be adjusted to a preprogrammed number of positions, the dropper seatpost adjustment positions may be that of the following three positions: up; middle; and down. Generally, the rider prefers that the dropper seatpost be in the "up" position during a ride over flat terrain, a road surface, or pedaling up small hills on a road surface. The rider generally prefers that the dropper seatpost be in the "middle" position when the rider still wants a small amount of power through pedaling but yet would still like the saddle to be at least partially out of the way. This situation may occur while riding down a gentle hill or when the rider anticipates having to climb a hill immediately after a short decent. The rider generally prefers that the dropper seatpost be in the "down" position when the rider is descending a steep hillside. In this situation, the rider would be positioned rearward of the saddle and essentially be in a mostly standing position. By doing such, the rider changes his center of gravity to be rearward of the bicycle and lower, thereby accomplishing a more stable and safer riding position. Additionally, since the saddle is lowered, it is not positioned in the riders' chest area, contributing to a safer ride.

Some mountain bikers prefer that the infinitely adjustable dropper seatpost be installed on their mountain bikes, enabling them to adjust their saddle at any given moment to any given terrain detail.

Figure 5:
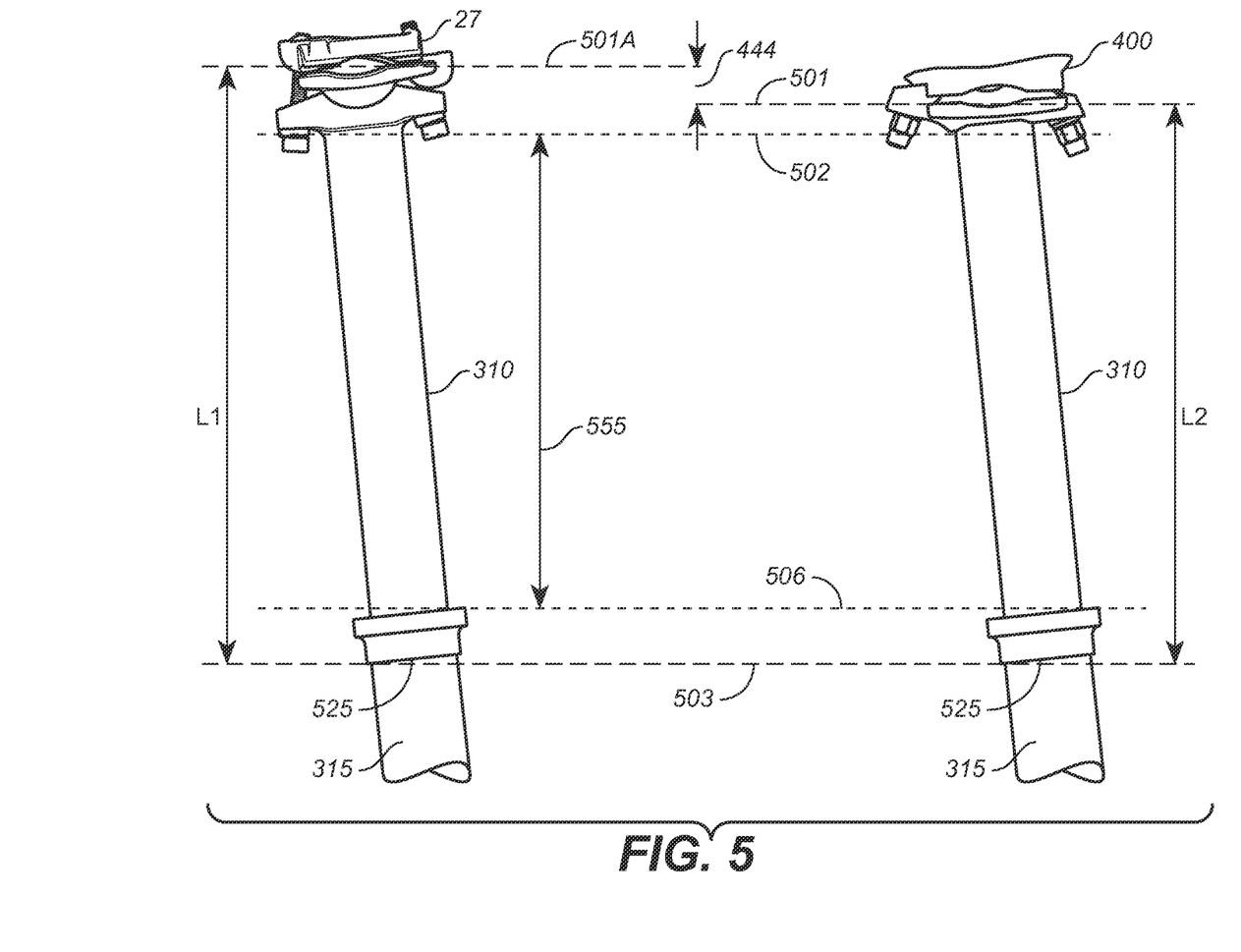
FIG. 5 is a perspective comparison illustrating the difference in dead length between a conventional seatpost and the reduced dead length dropper seatpost, in accordance with an embodiment.

FIG. 5 is a perspective comparison view showing the difference in dead length between a conventional dropper seatpost clamp setup 27 and the reduced dead length dropper seatpost with saddle clamp assembly 400, in accordance with an embodiment. As discussed in FIGS. 1-4, dropper seatpost 300 is a height adjustable dropper seatpost that can be raised or lowered based on a user selection at a handlebar (or other location).

In general, the overall manufacturing goal is to build a dropper seatpost 300 having saddle clamp assembly 400 with the most stroke for the lowest effective length. As shown in FIG. 5, the upper post 310 of the dropper seatpost goes into the lower post 315 of the dropper seatpost. The stroke 555 is the exposed amount of the upper post 310 of the dropper seatpost 300. In general, the stroke 555 is the distance from the line 506 indicative of the top of lower post 315 to the line 502 indicative of the bottom of the saddle clamp.

The effective length (L1 and L2 respectively) is the length between the center axis (501 and 501A respectively) of the saddle rail and the bottom of whatever the largest diameter portion of the lower portion that stops in the seat tube (referred to herein as "seat tube collar 525") and shown by line 503.

During installation, the seat tube collar 525 is the lowest portion of the dropper seatpost 300 that is visible after it is installed into the bike frame 119 seat tube. In one embodiment, the working length on a dropper seatpost is identified by the total travel distance or stroke 555. The dead length is the effective length of the dropper seatpost 300 in its dropped (or fully compressed) position. In other words, the distance between the center axis of the saddle rails and the bottom of the seat tube collar 525 when stroke 555 is reduced to effectively 0 mm in length. In one embodiment, the goal is to minimize the dead length.

In the conventional dropper seatpost clamp setup 27, the dead length is the distance between the center axis 501A of the saddle rails and the bottom of the seat tube collar 525 (identified by line 503), which is the effective length L1 minus the stroke 555. In contrast, in the dropper seatpost 300 having saddle clamp assembly 400, the dead length is the distance between the center axis 501 of the saddle rails and bottom of the seat tube collar 525 (identified by line 503), which is the effective length L2 minus the stroke 555. As can be seen in FIG. 5, the difference in the two dead lengths is distance 444. That is, the dead length of dropper seatpost 300 having saddle clamp assembly 400 is distance 444 less than the dead length of conventional dropper seatpost clamp setup 27.

As shown in the comparison of FIG. 5, embodiments described herein, reduce the distance from the center axis (501 and 501A respectively) of the saddle rails to the seat tube collar 525, e.g., reduce the dead length, by altering the shape of the lower saddle rail clamping portion 420 and the upper saddle rail clamping portion 430. In one embodiment, the dead length is additionally reduced by the change in the shape and/or orientation of clamping fasteners for the saddle clamp assembly 400.

For example, a rider wants to use a dropper seatpost 300 having a 150 mm stroke 555. However, when the dropper seatpost 300 is at its most dropped position, there is still an amount of dead length (e.g., 20 mm). Further, the dead length is added to the travel length which means that at its fully extended position the dropper seatpost will be 170 mm above the seat tube on the bike frame 119. In addition, there is also the size of the saddle 10 from the saddle rails 110 to the top of the saddle padded portion 12 (e.g., 30 mm). Thus, a rider wanting to use a dropper seat having a 150 mm stroke 555 may have a top of the saddle at 200 mm (150 mm travel+20 mm dead length+30 mm saddle height) above the seat tube. In some cases, this total distance of 200 mm will cause the rider to no longer be able to reach the pedals or be in a non-desired riding configuration. As such, the rider would have to use a shorter dropper seatpost having only a 100 mm total stroke.

As can be seen in the comparison provided in FIG. 5, the difference in dead length distance between the conventional dropper seatpost clamp setup 27 and saddle clamp assembly 400 is reduced by measurement 444. That is, in conventional dropper seatpost clamp setup 27 the center axis 501A of the saddle rail clamp is at a first distance L1. In contrast, the center axis 501 of saddle clamp assembly 400 (with the same stroke 555) is at a lesser distance L2. This occurs due to the modification of the shape of lower saddle rail clamping portion 420 and upper saddle rail clamping portion 430 of the saddle clamp assembly 400.

In one embodiment, the lower saddle rail clamping portion 420 has been modified to "droop" down so that the distance between the lower saddle rail clamping portion 420 (when clamped) to the seat tube collar 525 (e.g., the dead length) is reduced. In other words, the dead length is reduced due to the altering of the shape of the lower saddle rail clamping portion 420 and upper saddle rail clamping portion 430, while the stroke 555, dropper seatpost 300 shape, and dropper seatpost 300 internals remain unchanged. The unchanged aspects would include one or both of fasteners 805a and 805b still facing from the bottom to the top (as shown in FIGS. 8A and 8B).

FIG. 6 illustrates an embodiment of a saddle 10 including a padded portion 12 for sitting, a first saddle rail 110A, and a second saddle rail 110b (collectively "saddle rails 110"). The saddle 10 is for any vehicle that uses a saddle configuration such as, but not limited to, a bicycle, unicycle, tricycle, boat, or any type of vehicle that uses a saddle configuration. However, for purposes of clarity, the following discussion will utilize a bicycle for explanatory purposes.

Figure 7:
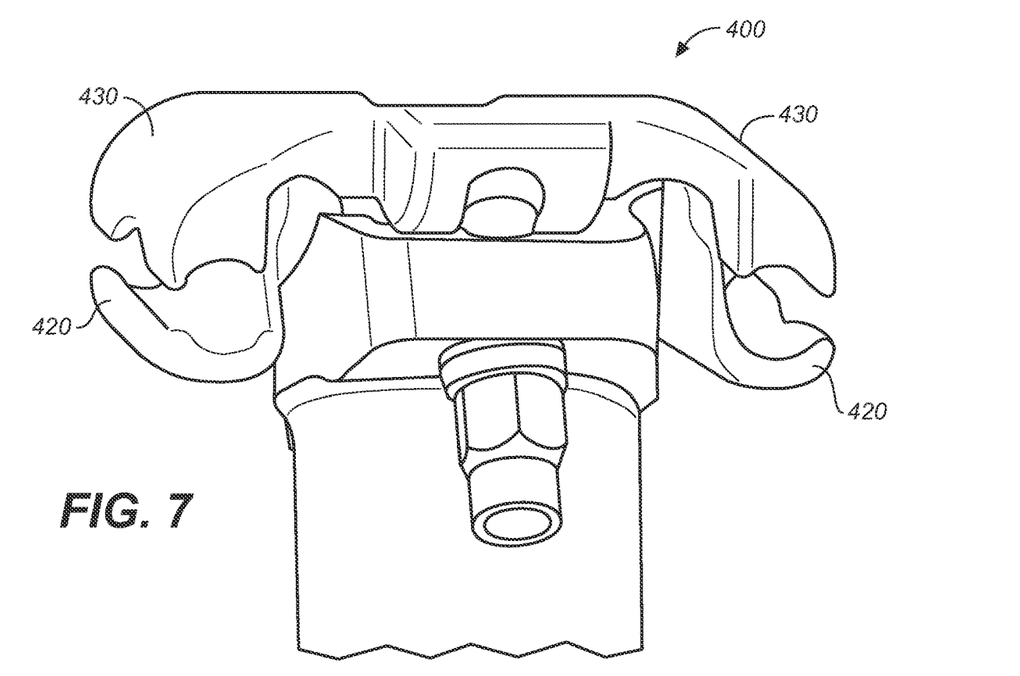
FIG. 7 is a front perspective view of a saddle clamp assembly for coupling the saddle of FIG. 6 to a dropper seatpost, in accordance with an embodiment.

FIG. 7 is a front perspective view of a saddle clamp assembly 400 for coupling saddle 10 of FIG. 6 to the bicycle frame 119. Saddle clamp assembly 400 of FIG. 7 is similar to the dropper seatpost and saddle clamp assembly 400 as discussion of FIG. 3. The saddle clamp assembly 400 is, for example, configured for coupling with saddle rails 110 shown in FIG. 6.

Figure 8A:
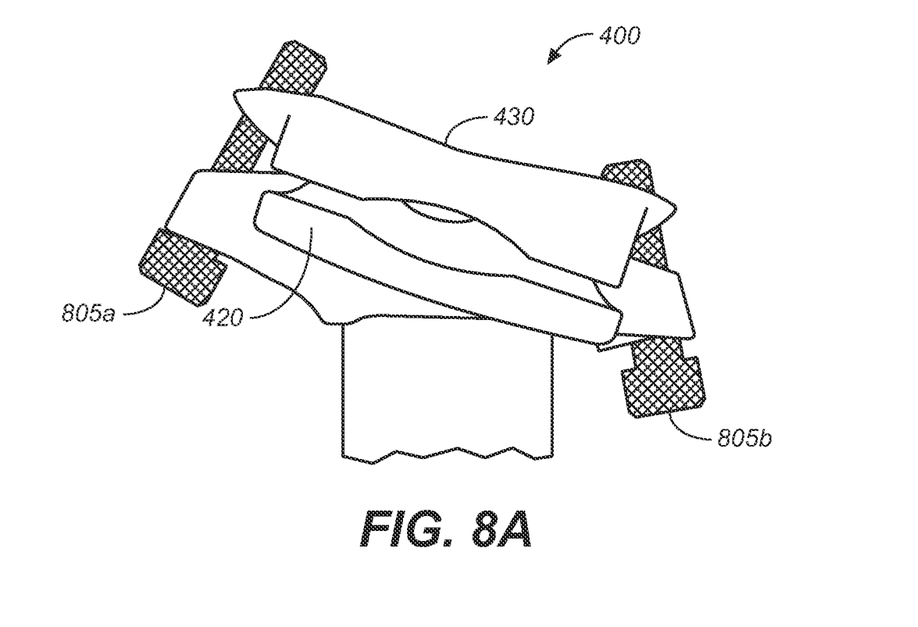
FIG. 8A is a side view of the saddle clamp assembly having two upward adjustable fasteners, in accordance with an embodiment.
Figure 8B:
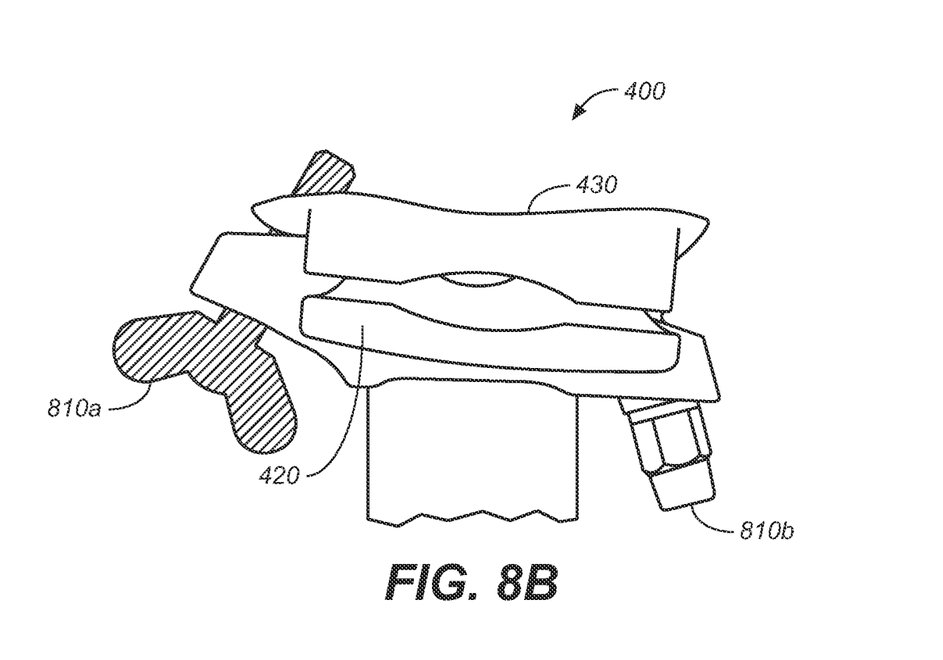
FIG. 8B is a side view of the saddle clamp assembly having one upward adjustable fastener and one downward adjustable fastener, in accordance with an embodiment.

FIG. 8A is a side view of the saddle clamp assembly having two upward adjustable fasteners 805a and 805b, in accordance with an embodiment. For example, the upward adjustable fasteners could be, but is not limited to, two fasteners 805a and 805b, two wingnuts screws 810A, a combination of a fastener 805b and a wingnut screw 810A, and the like.

FIG. 8B is a side view of the saddle clamp assembly having one upward adjustable fastener e.g., wingnut screw 810A and one downward adjustable fastener 810b, in accordance with an embodiment. In one embodiment, the fasteners can be of any sort that would work in the situation. For example, the upward adjustable fasteners could be, but is not limited to a fastener 805a, a wingnut screws 810A, a downward a combination of bolts 805b and wingnuts 810A.

Figure 8C:
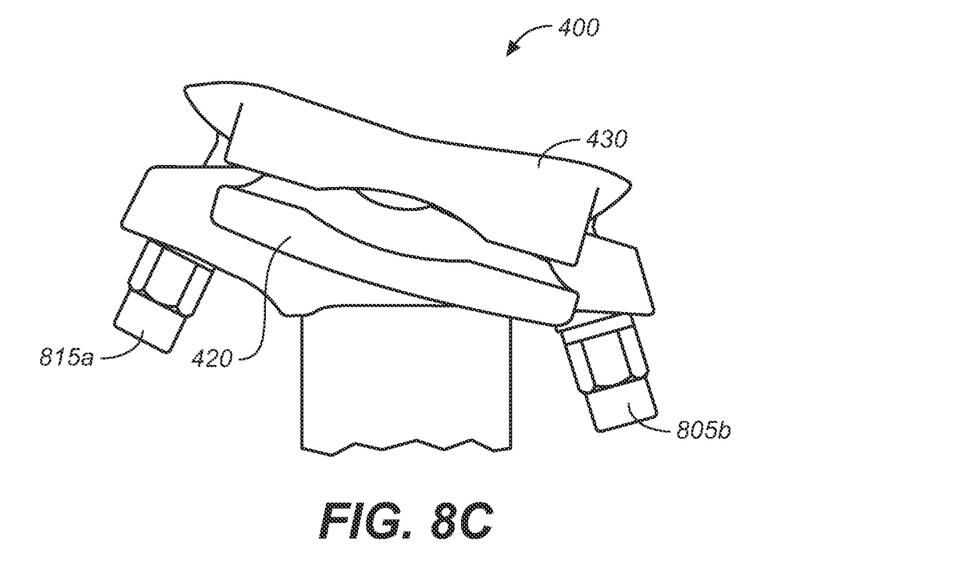
FIG. 8C is a side view of the saddle clamp assembly having two downward adjustable fasteners, in accordance with an embodiment.

FIG. 8C is a side view of the saddle clamp assembly having two downward adjustable fasteners 815a and 815b, in accordance with an embodiment.

Figure 8D:
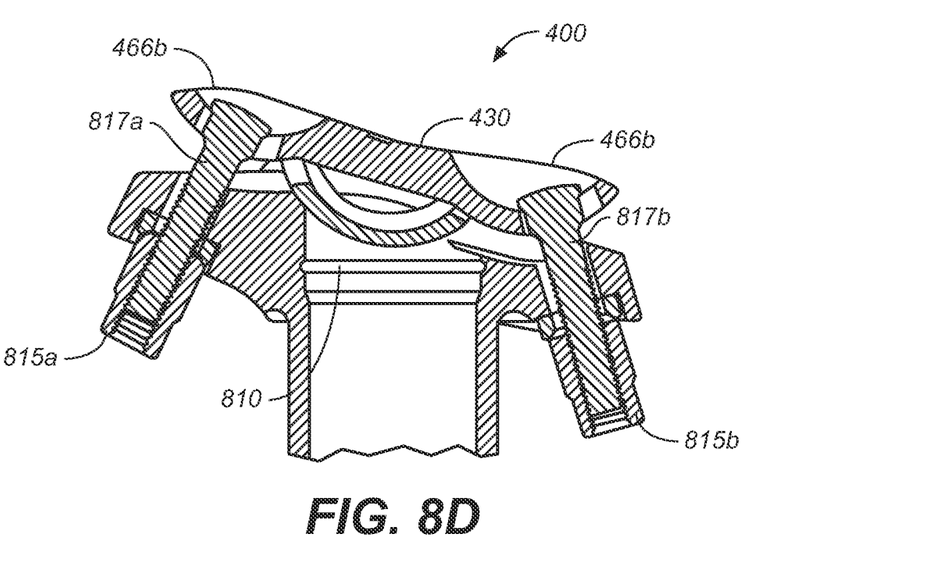
FIG. 8D is a side cutaway view of the saddle clamp assembly of FIG. 8C having two downward adjustable fasteners, in accordance with an embodiment.

FIG. 8D is a side cutaway view of the saddle clamp assembly of FIG. 8A having two downward adjustable fasteners 815a and 815b, in accordance with an embodiment. As shown in FIG. 8B, the two fasteners 817a and 817b have their heads in milled or otherwise manufactured small apertures 466a and 466b formed in upper saddle rail clamping portion 430 in order to keep any incursion of the fasteners 817a and/or 817b from moving above the plane established by upper saddle rail clamping portion 430.

In one embodiment, FIG. 8D also includes a snap ring grove 810 which indicates the top of the hydraulic system that supports the dropper seatpost at the various travel locations. This allows the full length of the dropper post travel (e.g., the full 150 mm, etc.)

Figure 9:
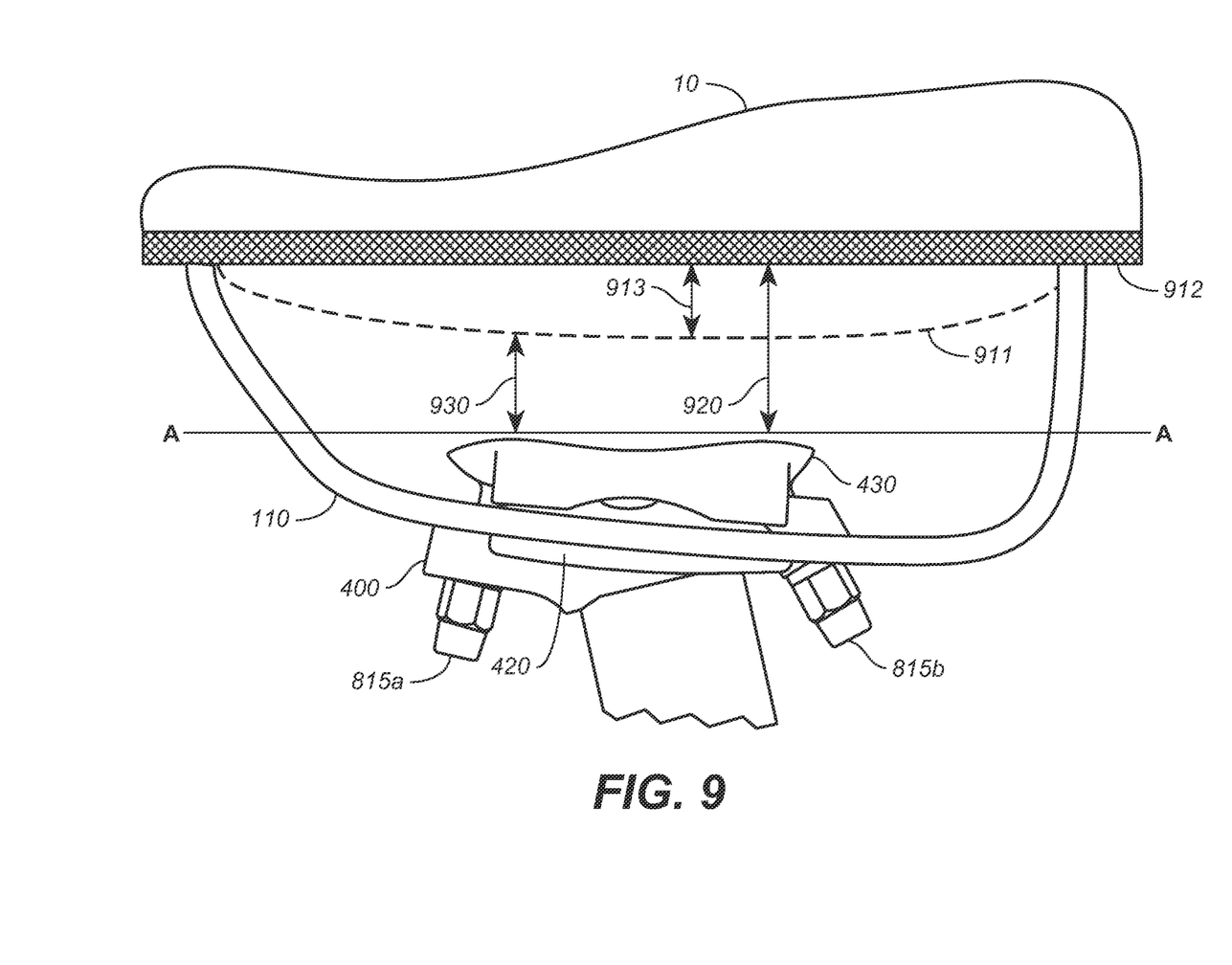
FIG. 9 is a side view of the saddle clamp assembly coupled with a saddle, in accordance with an embodiment.

FIG. 9 is a side view of the saddle clamp assembly 400 coupled with a saddle 10, in accordance with an embodiment. Saddle clamp assembly 400 includes saddle rails 110, lower saddle rail clamping portion 420, upper saddle rail clamping portion 430, and fasteners 815a and 815b. Saddle 10 includes saddle bottom 912.

As shown in FIG. 9, saddle bottom 912 has a build in flex 913 with a max flex range 911 indicated by broken line. In one embodiment, although the dead length is reduced by the modification of the lower saddle rail clamping portion 420 and the upper saddle rail clamping portion 430, e.g., the droop; the lowering of the lower saddle rail clamping portion 420 and the upper saddle rail clamping portion 430 will also reduce the distance between the bottom of the saddle and the top of the saddle rail clamp assembly (hereinafter "saddle bottom-to-dropper seatpost standoff distance 920"). In one embodiment, the saddle bottom-to-dropper seatpost standoff distance 920 changes with the pitch setting when the bolt configuration remains in an upward direction (such as discussed in FIGS. 8A and 8B. In such an embodiment, the range of saddle flex 913 (e.g., an amount of flex built into the saddle 10 for performance, comfort, etc.) is mechanically reduced when a portion of a fastener, such as fastener 805a (due to pitch adjustment of saddle 10) sticks up far enough to reduce the saddle bottom-to-dropper seatpost standoff distance 920 to a distance that is less than the range of saddle flex 913 standoff distance 930.

In general, if the saddle bottom-to-dropper seatpost standoff distance 920 is less than the range of saddle flex 913, it is possible that a flex of the saddle 10 will result in contact with the highest point in the saddle clamp assembly 400 causing a hard stop of the saddle 10. This hard stop would be jarring, would reduce the advantages provided by the saddle flex 913, and if the contact is made with a fastener, it would also provide a lot of force in a very small area which could cause saddle damage, fastener damage, unintentional pitch adjustment, location focused jarring to the rider, and the like.

For example, if the saddle flex 913 is 15 mm, then the saddle bottom-to-dropper seatpost standoff distance 920 would have to be greater than 15 mm. If the fasteners that change the pitch can encroach on the saddle bottom-to-dropper seatpost standoff distance 920, then the greatest possible fastener encroachments (e.g., at a minimum or maximum pitch) would have to be added to the saddle bottom-to-dropper seatpost standoff distance 920 to account for the fastener encroachment. In one embodiment, this minimum distance could require a reduction in the overall droop of the rail clamps, or the like, which would limit the attainable amount of dead length reduction.

In one embodiment, to overcome any incursion into the saddle bottom-to-dropper seatpost standoff distance 920 thereby allowing the maximum "droop" in the lower saddle rail clamping portion 420 and the upper saddle rail clamping portion 430, the fasteners 815a and 815b in the saddle clamp assembly 400 are inverted. In other words, the head of the fasteners 817a and 817b are in the upper saddle rail clamping portion 430 and additional mechanical components, e.g., fasteners 815a and 815b, are provided on the underside of the seatpost fasteners 817a and 817b to accommodate manipulation of the working length of the fastener. That is, the additional mechanical component provides the capability to adjust the pitch by adjusting the location of the additional mechanical components, e.g., fasteners 815a and 815b with respect to the fasteners 817a and 817b.

In one embodiment, by inverting fasteners 817a and 817b, the upper saddle rail clamping portion 430 of the saddle clamp assembly 400 will become the point on the dropper seatpost body closest to the saddle bottom 912 (as indicated by line A-A). This change in configuration allows the saddle bottom-to-dropper seatpost standoff distance 920 to be standardized as a measurement defined by the amount of droop in lower saddle rail clamping portion 420 and the upper saddle rail clamping portion 430 subtracted from the distance from the upper saddle rail clamping portion 430 to the saddle bottom 912.

Further, since the inverted fasteners 817a and 817b will no longer (or minimally) extend from upper saddle rail clamping portion 430 of the saddle clamp assembly 400, fasteners 817a and 817b will not be able to make incursions into the saddle bottom-to-dropper seatpost standoff distance 920. Moreover, since the pitch of the saddle will be made by adjusting the mechanical component fasteners 815a and 815b on the lower saddle rail clamping portion 420 of the saddle clamp assembly 400, any adjustment to change in the dropper seatpost pitch (resulting in a saddle pitch adjustment) will not change the saddle bottom-to-dropper seatpost standoff distance 920.

Thus, the drooped lower saddle rail clamping portion 420 and the upper saddle rail clamping portion 430 with inverted fasteners 817a and 817b will provide a maximum rail clamp droop thereby providing a maximum reduction in the dead length, while also providing a lower minimum saddle height; without detrimentally affecting the saddle flex 913, the dropper total travel distance T, and/or any other performance characteristics. Thus, the embodiment will increase the shortest and tallest rider height range for any length dropper seatpost.

In one embodiment, the drooped lower saddle rail clamping portion 420 and the upper saddle rail clamping portion 430 with inverted fasteners 817a and 817b will maintain a uniform (non-variable) max saddle flex 911 standoff distance 930 between the saddle bottom 912 and the upper saddle rail clamping portion 430 regardless of any pitch angle of the dropper seatpost and/or saddle or any adjustment to any components that would cause the adjustment of the pitch angle.

In one embodiment, the drooped lower saddle rail clamping portion 420 and upper saddle rail clamping portion 430 with inverted fasteners 827a and 827b will maintain a small dropper seatpost standoff distance 920 between the saddle bottom 912 and the upper saddle rail clamping portion 430 during an extreme pitch angle of the dropper seatpost and/or saddle or any adjustment to any components that would cause the extreme pitch adjustment of the pitch angle.

Figure 10A:
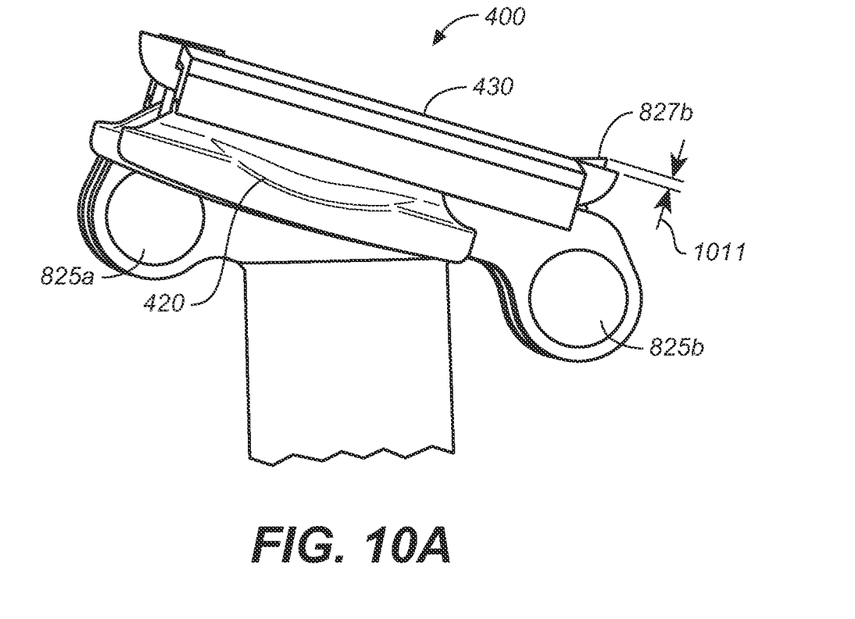
FIG. 10A is a side view of the saddle clamp assembly having two downward adjustable fasteners with barrel nuts showing a top clamp fastener head intrusion at a first pitch setting, in accordance with an embodiment.

FIG. 10A is a side view of the saddle clamp assembly 400 having two downward adjustable fasteners with barrel nuts 825a and 825b, showing a head of fastener 827b incursion a distance 1011 at a first pitch setting, in accordance with an embodiment.

Figure 10B:
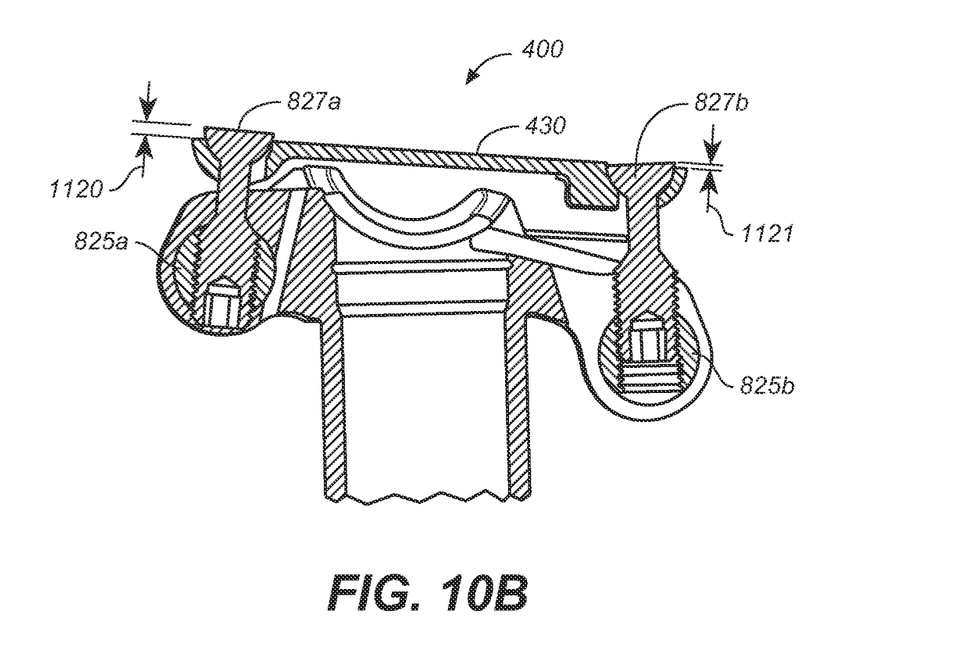
FIG. 10B is a side view of the saddle clamp assembly having two downward adjustable fasteners with barrel nuts showing a top clamp fastener head intrusion at a second pitch setting, in accordance with an embodiment.

FIG. 10B is a side view of the saddle clamp assembly 400 having two downward adjustable fasteners 827a and 827b with barrel nuts 825a and 825b in a second pitch setting. In FIG. 10B, the head of fastener 827b causes an incursion of a distance 1121 while the head of fastener 827a causes an incursion of a distance 1120 in accordance with an embodiment.

In one embodiment, the barrel nuts 825a and 825b are used to make sure nothing sharp is sticking out from the bottom of the saddle clamp assembly 400. The fasteners 827a and 827b include hex broaches for Allen wrenches. By using the barrel nuts 825a and 825b and hex broaches in the fasteners 827a and 827b the adjustment to the saddle pitch will be performed by an Allen wrench in a similar manner that is done in many present pitch adjustments.

In one embodiment, such as when the pitch is at a high angle, there is an opportunity for a slight fastener rise above the flat body of the upper saddle rail clamping portion 430. However, this would be a minimal amount. In another embodiment, a hole (similar to small apertures 466a and 466b of FIG. 8D) which one or both of the fasteners 827a and 827b are in will be deeper to ensure there is no portion of the fasteners 827a and 827b breaking the upper saddle rail clamping portion 430 plane. In one embodiment, the hole which the fasteners 827a and 827b are in will include a slight raised lip to ensure there is no portion of fasteners 827a and 827b breaking the upper saddle rail clamping portion 430 plane regardless of saddle pitch angle.

The foregoing Description of Embodiments is not intended to be exhaustive or to limit the embodiments to the precise form described. Instead, example embodiments in this Description of Embodiments have been presented in order to enable persons of skill in the art to make and use embodiments of the described subject matter. Moreover, various embodiments have been described in various combinations. However, any two or more embodiments can be combined. Although some embodiments have been described in a language specific to structural features and/or methodological acts, it is to be understood that the subject matter defined in the appended claims is not necessarily limited to the specific features or acts described above. Rather, the specific features and acts described above are disclosed by way of illustration and as example forms of implementing the claims and their equivalents.

What is claimed is:

1. A housing for a seatpost comprising:
   a lower saddle rail clamping portion rotatably coupled with said housing, said lower saddle rail clamping portion having a drooped shape such that said lower saddle rail clamping portion hangs down in a horizontal plane that intersects at or below a portion of said housing when said housing is coupled with said seatpost;
   an upper saddle rail clamping portion to couple with said lower saddle rail clamping portion to form a clamping structure to clamp at least one saddle rail of a saddle; and
   at least one fastener to fixedly couple said upper saddle rail clamping portion with said lower saddle rail clamping portion at a location on said housing,
      said at least one fastener inverted in said housing to increase a standoff distance between a bottom of said saddle and a top of said at least one fastener,
      said inversion causing a head of said at least one fastener to be located at an upper portion of said housing,
      said inversion further causing a mechanical component that tightens or loosens said at least one fastener to be located at a lower portion of said housing.

2. A seatpost assembly comprising:
   a lower saddle rail clamping portion rotatably coupled with a housing;
   an upper saddle rail clamping portion to couple with said lower saddle rail clamping portion to form a clamping structure to clamp at least one saddle rail of a saddle;
   a first fastener to fixedly couple said upper saddle rail clamping portion with said lower saddle rail clamping portion at a first location on said housing;
   at least a second fastener to fixedly couple said upper saddle rail clamping portion with said lower saddle rail clamping portion at a second location on said housing, wherein an adjustment to one or both of said first fastener and said second fastener adjusts a pitch of said saddle,
      wherein none of said first fastener or at least said second fastener protrude into a region between said upper saddle rail clamping portion and said saddle; and
   at least one of said first fastener or said second fastener is inverted in said housing to increase a standoff distance between a bottom of said saddle and a top of said first fastener or said second fastener,
      said inversion causing a head of said at least one of said first fastener or said second fastener to be located at a top of said saddle rail clamp assembly,
      said inversion further causing a mechanical component that tightens or loosens said first fastener or said second fastener to be located at a bottom of said saddle rail clamp assembly.

3. A system comprising:
   a lower post for insertion into a seat tube of a vehicle;

an upper post to telescopically couple with respect to said lower post to form a dropper seatpost;
a housing coupled to one end of said upper post;
a saddle rail clamp assembly coupled to said housing, said saddle rail clamp assembly comprising:
  a lower saddle rail clamping portion rotatably coupled with said housing, said lower saddle rail clamping portion having a drooped shape such that said lower saddle rail clamping portion hangs down in a horizontal plane that intersects at or below a portion of said housing; and
  an upper saddle rail clamping portion to couple with said lower saddle rail clamping portion to form a clamping structure in said horizontal plane that intersects at least said portion of said housing;
said saddle rail clamp assembly to couple at least one saddle rail of a saddle with said dropper seatpost via said clamping structure;
a first fastener to fixedly couple said upper saddle rail clamping portion with said lower saddle rail clamping portion at a first location on said housing; and
at least a second fastener to fixedly couple said upper saddle rail clamping portion with said lower saddle rail clamping portion at a second location on said housing, wherein an adjustment to one or both of said first fastener and said second fastener adjusts a pitch of said saddle; and
at least one of said first fastener or said second fastener inverted in said housing to increase a standoff distance between a bottom of said saddle and a top of said first fastener or said second fastener,
  said inversion causing a head of said at least one of said first fastener or said second fastener to be located at a top of said saddle rail clamp assembly,
  said inversion further causing a mechanical component that tightens or loosens said first fastener or said second fastener to be located at a bottom of said saddle rail clamp assembly.

4. The system of claim 3, further comprising:
both of said first fastener and said second fastener inverted in said housing to increase said standoff distance between said bottom of said saddle and said top of said first fastener and said second fastener.

5. The system of claim 3, further comprising:
a user interface operatively connected with said dropper seatpost, said user interface to receive input and adjust a height of said dropper seatpost based on said input.

6. The system of claim 5, wherein said user interface comprises at least one of a GUI, a button, a dial, a smart device, and a lever.

7. The system of claim 5, wherein said user interface is wirelessly coupled with said dropper seatpost.

8. The system of claim 3, further comprising:
the upper post having an outer diameter (OD) smaller than an inner diameter (ID) of said lower post, to telescopically slide said upper post into said lower post to form said dropper seatpost.

9. The system of claim 3, further comprising:
the lower post having an outer diameter (OD) smaller than an inner diameter (ID) of said upper post, to telescopically slide said lower post into said upper post to form said dropper seatpost.

10. A dropper seatpost with head assembly comprising:
a lower post for insertion into a seat tube of a vehicle;
an upper post to telescopically slide with respect to said lower post to form a dropper seatpost;
a housing coupled to one end of said upper post;
a saddle rail clamp assembly to couple at least one saddle rail of a saddle with said dropper seatpost via a clamping structure, said saddle rail clamp assembly comprising:
  a lower saddle rail clamping portion rotatably coupled with said housing,
    said lower saddle rail clamping portion having a drooped shape such that said lower saddle rail clamping portion hangs down in a plane that intersects at or below a portion of said housing; and
  an upper saddle rail clamping portion to couple with said lower saddle rail clamping portion to form said clamping structure in said plane that intersects at or below said portion of said housing;
a first fastener to fixedly couple said upper saddle rail clamping portion with said lower saddle rail clamping portion at a first location on said housing; and
at least a second fastener to fixedly couple said upper saddle rail clamping portion with said lower saddle rail clamping portion at a second location on said housing, wherein an adjustment to one or both of said first fastener and said second fastener adjusts a pitch of said saddle; and
at least one of said first fastener or said second fastener inverted in said housing to increase a standoff distance between a bottom of said saddle and a top of said first fastener or said second fastener,
  said inversion causing a head of said at least one of said first fastener or said second fastener to be located at a top of said saddle rail clamp assembly,
  said inversion further causing a mechanical component that tightens or loosens said first fastener or said second fastener to be located at a bottom of said saddle rail clamp assembly.

11. The dropper seatpost with head assembly of claim 10, wherein said housing is fixedly coupled to one end of said upper post during manufacture.

12. The dropper seatpost with head assembly of claim 10, wherein said housing and said upper post are a single component.

13. The dropper seatpost with head assembly of claim 10, wherein said housing is formed from a first material, and said upper post is formed from a second material, the second material different than said first material.

14. The dropper seatpost with head assembly of claim 10, further comprising:
a user interface operatively connected with said dropper seatpost, said user interface to receive input and adjust a height of said dropper seatpost based on said input.

15. An assembly comprising:
a lower post for insertion into a seat tube of a vehicle;
an upper post to telescopically slide with respect to said lower post to form a dropper seatpost;
a housing fixedly coupled to one end of said upper post; and
a saddle rail clamp assembly to couple at least one saddle rail of a saddle with said dropper seatpost via a clamping structure, said saddle rail clamp assembly comprising:
  a lower saddle rail clamping portion rotatably coupled with said housing,
    said lower saddle rail clamping portion having a drooped shape such that said lower saddle rail clamping portion hangs down in a plane that intersects at least a portion of said housing;

an upper saddle rail clamping portion to couple with said lower saddle rail clamping portion to form said clamping structure in said plane that intersects at least said portion of said housing;

a first fastener to fixedly couple said upper saddle rail clamping portion with said lower saddle rail clamping portion at a first location on said housing;

at least a second fastener to fixedly couple said upper saddle rail clamping portion with said lower saddle rail clamping portion at a second location on said housing, wherein an adjustment to one or both of said first fastener and said second fastener adjusts a pitch of said saddle; and at least one of said first fastener or said second fastener is inverted in said housing to increase a standoff distance between a bottom of said saddle and a top of said first fastener or said second fastener, said inversion causing a head of said at least one of said first fastener or said second fastener to be located at a top of said saddle rail clamp assembly, said inversion further causing a mechanical component that tightens or loosens said first fastener or said second fastener to be located at a bottom of said saddle rail clamp assembly.

\* \* \* \* \*